United States Patent
Flohr et al.

(10) Patent No.: US 8,080,705 B2
(45) Date of Patent: *Dec. 20, 2011

(54) SUPERABSORBENT POLYMERS COMPRISING DIRECT COVALENT BONDS BETWEEN POLYMER CHAIN SEGMENTS AND METHOD OF MAKING THEM

(75) Inventors: Andreas Flohr, Kronberg (DE); Torsten Lindner, Kronberg (DE)

(73) Assignee: The Procter & Gamble Company, Cincinnati, OH (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/182,421

(22) Filed: Jul. 15, 2005

(65) Prior Publication Data

US 2006/0025734 A1    Feb. 2, 2006

(30) Foreign Application Priority Data

Jul. 28, 2004    (EP) .................................... 04017794
Feb. 8, 2005    (EP) .................................... 05002556

(51) Int. Cl.
*A61F 13/53*    (2006.01)
(52) U.S. Cl. .................. 604/368; 525/316; 522/121
(58) Field of Classification Search .......... 604/359–361, 604/368
See application file for complete search history.

(56) References Cited

U.S. PATENT DOCUMENTS

| | | | |
|---|---|---|---|
| 2,788,003 A * | 4/1957 | Van Norden ................... | 604/366 |
| 3,214,492 A | 10/1965 | Tocker | |
| 3,429,852 A | 2/1969 | Martin | |
| 3,622,848 A | 11/1971 | Hendrix et al. | |
| 3,661,875 A | 5/1972 | Sieja | |
| 3,860,003 A | 1/1975 | Buell | |
| 3,935,099 A | 1/1976 | Weaver et al. | |
| 3,948,740 A * | 4/1976 | Phalangas ...................... | 522/62 |
| 3,959,569 A | 5/1976 | Burkholder, Jr. | |
| 4,002,173 A * | 1/1977 | Manning et al. .............. | 604/368 |
| 4,043,887 A | 8/1977 | Pacifici et al. | |
| 4,062,817 A | 12/1977 | Westerman | |
| 4,076,663 A | 2/1978 | Masuda et al. | |
| 4,093,776 A | 6/1978 | Aoki et al. | |
| 4,124,748 A | 11/1978 | Fujimoto et al. | |
| 4,192,727 A * | 3/1980 | Ward .......................... | 521/50.5 |
| 4,286,082 A | 8/1981 | Tsubakimoto | |
| 4,304,895 A | 12/1981 | Loshaek | |
| 4,367,323 A | 1/1983 | Kitamura | |
| 4,389,513 A | 6/1983 | Miyazaki | |
| 4,446,261 A | 5/1984 | Yamasaki et al. | |
| 4,514,345 A | 4/1985 | Johnson et al. | |
| 4,610,678 A | 9/1986 | Weisman et al. | |
| 4,625,001 A | 11/1986 | Tsubakimoto et al. | |
| 4,654,039 A | 3/1987 | Brandt et al. | |
| 4,666,983 A | 5/1987 | Tsubakimoto et al. | |
| 4,683,274 A | 7/1987 | Nakamura et al. | |
| 4,690,996 A | 9/1987 | Shih et al. | |
| 4,721,647 A | 1/1988 | Nakanishi et al. | |
| 4,734,478 A | 3/1988 | Tsubakimoto et al. | |
| 4,738,867 A | 4/1988 | Itoh et al. | |
| 4,748,076 A | 5/1988 | Saotome | |
| 4,769,427 A | 9/1988 | Nowakowsky et al. | |
| 4,783,510 A * | 11/1988 | Saotome ..................... | 525/329.7 |
| 4,834,735 A | 5/1989 | Alemany et al. | |
| 4,847,137 A | 7/1989 | Kellen et al. | |
| 4,873,299 A | 10/1989 | Nowakowsky et al. | |
| 4,890,911 A * | 1/1990 | Sulc et al. ................. | 351/160 H |
| 4,910,250 A | 3/1990 | Saotome | |
| 4,922,004 A | 5/1990 | Kohler et al. | |
| 4,940,464 A | 7/1990 | Van Gompel et al. | |
| 4,950,683 A | 8/1990 | Ward et al. | |
| 4,950,692 A | 8/1990 | Lewis et al. | |
| 4,973,632 A | 11/1990 | Nagasuna et al. | |
| 4,985,518 A | 1/1991 | Alexander et al. | |
| 5,032,628 A * | 7/1991 | Choi et al. ..................... | 523/409 |
| 5,075,344 A * | 12/1991 | Johnson ....................... | 521/140 |
| 5,124,416 A | 6/1992 | Haruna et al. | |
| 5,128,386 A | 7/1992 | Rehmer et al. | |
| 5,137,537 A | 8/1992 | Herron | |
| 5,145,906 A | 9/1992 | Chambers et al. | |
| 5,147,345 A | 9/1992 | Young et al. | |
| 5,151,092 A | 9/1992 | Buell et al. | |
| 5,164,459 A | 11/1992 | Kimura et al. | |

(Continued)

FOREIGN PATENT DOCUMENTS

| | | |
|---|---|---|
| DE | 196 19 680 A | 11/1997 |
| DE | 102 21 202 A | 7/2003 |
| EP | 0246848 A | 11/1987 |
| EP | 0 248 437 A2 | 12/1987 |
| EP | 0 279 475 A2 | 8/1988 |
| EP | 0 377 191 A2 | 7/1990 |
| EP | 0 514 775 A1 | 11/1992 |
| EP | 287970 B1 | 1/1994 |
| EP | 0 700 673 A1 | 3/1996 |
| EP | 0 509 708 B1 | 12/1997 |

(Continued)

OTHER PUBLICATIONS

European Search Report, mailed Feb. 8, 2005, 3 pages.
International Search Report dated Jul. 30, 2008 (4 pages).
Y. Tang, R.P. Thorn, R.L. Mauldin III, P.H. Wine, Kinetics and Spectroscopy of the $SO_4$-Radical in Aqueous Solution, Journal of Photochemistry and Photobiology, A: Chemistry, 44(1988), pp. 243-258, Elsevier Sequoia/Printed in The Netherlands.

(Continued)

*Primary Examiner* — Melanie Hand
*Assistant Examiner* — Paula Craig
(74) *Attorney, Agent, or Firm* — John G. Powell; Eric T. Addington

(57) ABSTRACT

The present invention relates to superabsorbent polymer particles with improved surface cross-linking and their use in absorbent articles.
Superabsorbent polymers of the invention comprise polymer chain segments, wherein at least a part of these polymer chain segments are cross-linked to each other through direct covalent bonds.
Moreover, the invention relates to a process for making these superabsorbent polymer particles.

7 Claims, No Drawings

U.S. PATENT DOCUMENTS

| | | | |
|---|---|---|---|
| 5,223,645 A | 6/1993 | Barwich et al. | |
| 5,244,735 A | 9/1993 | Kimura et al. | |
| 5,244,934 A * | 9/1993 | Umeda et al. | 522/129 |
| 5,248,805 A | 9/1993 | Boettcher et al. | |
| 5,250,640 A | 10/1993 | Irie et al. | |
| 5,260,345 A | 11/1993 | Desmarais et al. | |
| 5,264,495 A | 11/1993 | Irie et al. | |
| 5,264,533 A | 11/1993 | Rehmer et al. | |
| 5,275,773 A | 1/1994 | Irie et al. | |
| 5,342,338 A | 8/1994 | Roe et al. | |
| 5,380,808 A | 1/1995 | Sumiya et al. | |
| 5,387,207 A | 2/1995 | Dyer | |
| 5,389,699 A | 2/1995 | Rehmer et al. | |
| 5,397,316 A | 3/1995 | Lavon | |
| 5,422,405 A | 6/1995 | Dairoku et al. | |
| 5,437,418 A * | 8/1995 | Graef et al. | 241/65 |
| 5,478,879 A | 12/1995 | Kajikawa et al. | |
| 5,536,264 A * | 7/1996 | Hsueh et al. | 604/368 |
| 5,549,590 A * | 8/1996 | Suskind et al. | 604/368 |
| 5,554,145 A | 9/1996 | Roe et al. | |
| 5,562,646 A | 10/1996 | Goldman et al. | |
| 5,563,183 A * | 10/1996 | Nunez et al. | 523/106 |
| 5,569,234 A | 10/1996 | Buell et al. | |
| 5,597,873 A * | 1/1997 | Chambers et al. | 525/330.1 |
| 5,610,208 A | 3/1997 | Dairoku et al. | |
| 5,625,222 A | 4/1997 | Yoneda et al. | |
| 5,633,316 A | 5/1997 | Gartner et al. | |
| 5,650,222 A | 7/1997 | DesMarais et al. | |
| 5,859,084 A | 1/1999 | Schroder et al. | |
| 5,883,158 A | 3/1999 | Nambu et al. | |
| 5,922,417 A | 7/1999 | Singleton et al. | |
| 5,976,696 A | 11/1999 | Collette et al. | |
| 5,981,689 A * | 11/1999 | Mitchell et al. | 528/229 |
| 6,004,306 A | 12/1999 | Robles et al. | |
| 6,007,833 A | 12/1999 | Chudzik et al. | |
| 6,011,196 A * | 1/2000 | Wang et al. | 604/368 |
| 6,043,311 A | 3/2000 | Houben et al. | |
| 6,072,101 A * | 6/2000 | Beihoffer et al. | 604/372 |
| 6,130,304 A * | 10/2000 | Sumiya et al. | 526/317.1 |
| 6,159,591 A * | 12/2000 | Beihoffer et al. | 428/327 |
| 6,194,631 B1 * | 2/2001 | Mitchell et al. | 604/368 |
| 6,222,091 B1 | 4/2001 | Beihoffer et al. | |
| 6,228,930 B1 | 5/2001 | Dairoku et al. | |
| 6,239,230 B1 * | 5/2001 | Eckert et al. | 525/329.9 |
| 6,359,049 B1 | 3/2002 | Carrico et al. | |
| 6,376,072 B1 | 4/2002 | Evans et al. | |
| 6,417,425 B1 * | 7/2002 | Whitmore et al. | 604/367 |
| 6,455,600 B1 | 9/2002 | Hahnle et al. | |
| 6,562,879 B1 | 5/2003 | Hatsuda et al. | |
| 6,565,981 B1 * | 5/2003 | Messner et al. | 428/441 |
| 6,566,406 B1 * | 5/2003 | Pathak et al. | 514/772.1 |
| 6,572,735 B1 * | 6/2003 | Wallajapet et al. | 162/115 |
| 6,579,958 B2 | 6/2003 | Wilson | |
| 6,603,056 B2 * | 8/2003 | Beihoffer et al. | 604/372 |
| 6,803,107 B2 | 10/2004 | Mitchell et al. | |
| 6,846,518 B2 | 1/2005 | Katoh et al. | |
| 7,166,356 B2 * | 1/2007 | Flohr | 428/403 |
| 7,169,843 B2 * | 1/2007 | Smith et al. | 524/556 |
| 7,183,336 B2 * | 2/2007 | Berlin et al. | 522/88 |
| 7,199,211 B2 | 4/2007 | Popp et al. | |
| 7,259,212 B2 | 8/2007 | Popp et al. | |
| 7,285,614 B2 * | 10/2007 | Jonas et al. | 526/317.1 |
| 7,405,321 B2 | 7/2008 | Riegel et al. | |
| 7,405,341 B2 * | 7/2008 | Beruda et al. | 604/368 |
| 7,420,013 B2 | 9/2008 | Riegel et al. | |
| 7,449,219 B2 * | 11/2008 | Flohr | 427/508 |
| 7,452,922 B2 | 11/2008 | Berlin et al. | |
| 7,588,777 B2 * | 9/2009 | Flohr et al. | 424/443 |
| 7,655,830 B2 * | 2/2010 | Flohr et al. | 604/368 |
| 7,838,569 B2 * | 11/2010 | Flohr et al. | 522/4 |
| 7,871,640 B2 * | 1/2011 | Flohr et al. | 424/443 |
| 2001/0001312 A1 * | 5/2001 | Mitchell et al. | 604/368 |
| 2002/0053754 A1 | 5/2002 | Katoh et al. | |
| 2003/0045847 A1 | 3/2003 | Engelhardt et al. | |
| 2003/0135172 A1 | 7/2003 | Engelhardt et al. | |
| 2003/0225384 A1 * | 12/2003 | Zenker et al. | 604/367 |
| 2003/0233082 A1 | 12/2003 | Kline et al. | |
| 2004/0137250 A1 | 7/2004 | Daniel et al. | |
| 2004/0140070 A1 | 7/2004 | Ponomarenko et al. | |
| 2004/0143030 A1 | 7/2004 | Ikkai | |
| 2004/0155383 A1 | 8/2004 | Jackson et al. | |
| 2004/0162536 A1 * | 8/2004 | Becker et al. | 604/367 |
| 2004/0167486 A1 | 8/2004 | Busam et al. | |
| 2005/0003176 A1 | 1/2005 | Katoh et al. | |
| 2005/0032936 A1 * | 2/2005 | Flohr | 523/205 |
| 2005/0048221 A1 | 3/2005 | Irie et al. | |
| 2005/0142965 A1 | 6/2005 | LaFortune | |
| 2005/0203474 A1 * | 9/2005 | Flohr | 604/368 |
| 2005/0215752 A1 | 9/2005 | Popp et al. | |
| 2005/0234410 A1 | 10/2005 | Ashton et al. | |
| 2006/0020053 A1 * | 1/2006 | Flohr et al. | 522/150 |
| 2006/0020078 A1 | 1/2006 | Popp et al. | |
| 2006/0030829 A1 * | 2/2006 | Flohr et al. | 604/368 |
| 2006/0052478 A1 | 3/2006 | Madsen et al. | |
| 2006/0089611 A1 | 4/2006 | Herfert et al. | |
| 2006/0128827 A1 | 6/2006 | Matsumoto et al. | |
| 2006/0128902 A1 * | 6/2006 | Flohr et al. | 525/329.7 |
| 2006/0212011 A1 | 9/2006 | Popp et al. | |
| 2006/0235141 A1 | 10/2006 | Riegel et al. | |
| 2006/0247377 A1 | 11/2006 | Riegel et al. | |
| 2007/0048516 A1 | 3/2007 | Flohr et al. | |
| 2007/0048517 A1 * | 3/2007 | Flohr et al. | 428/323 |
| 2007/0048518 A1 * | 3/2007 | Flohr et al. | 428/323 |
| 2007/0049689 A1 | 3/2007 | Meyer et al. | |
| 2007/0082142 A1 * | 4/2007 | Flohr | 427/457 |
| 2007/0167536 A1 | 7/2007 | Iwamura et al. | |
| 2007/0238806 A1 | 10/2007 | Mitsukami et al. | |
| 2009/0299315 A1 * | 12/2009 | Flohr et al. | 604/368 |

FOREIGN PATENT DOCUMENTS

| | | |
|---|---|---|
| EP | 811636 B1 | 8/2001 |
| EP | 1178059 A2 | 2/2002 |
| EP | 456136 B1 | 3/2002 |
| EP | 1 199 327 A2 | 4/2002 |
| EP | 1 302 485 A1 | 4/2003 |
| EP | 955086 B1 | 9/2003 |
| EP | 844270 B1 | 11/2004 |
| EP | 922717 B1 | 1/2005 |
| EP | 1 504 771 A1 | 2/2005 |
| EP | 1506788 A | 2/2005 |
| EP | 1516884 A2 | 3/2005 |
| EP | 1624002 A | 2/2006 |
| EP | 1757646 A | 2/2007 |
| EP | 1 264 930 | 9/2008 |
| JP | 01 092226 A | 4/1989 |
| JP | 01292103 A | 11/1989 |
| JP | 2003-073919 | 3/2003 |
| JP | 2003 156961 A | 5/2003 |
| WO | WO 81/03274 A1 | 11/1981 |
| WO | WO 93/16131 A1 | 8/1993 |
| WO | WO 0189591 A2 | 11/2001 |
| WO | WO 0189592 A2 | 11/2001 |
| WO | WO 02/094328 A | 11/2002 |
| WO | WO 02/100912 | 12/2002 |
| WO | WO 03/043670 A1 | 5/2003 |
| WO | WO 2004/031253 A1 | 4/2004 |
| WO | WO 2004/085496 A | 10/2004 |
| WO | WO 2005/014066 A1 | 2/2005 |
| WO | WO 2005/044915 A1 | 5/2005 |
| WO | WO 2005/082429 A2 | 9/2005 |
| WO | WO 2005/097313 A1 | 10/2005 |
| WO | WO 2006/062253 A1 | 6/2006 |
| WO | WO 2006/062258 A2 | 6/2006 |
| WO | WO 2006/063229 A2 | 6/2006 |

OTHER PUBLICATIONS

Om P. Chawla and Richard W. Fessenden, Electron Spin Resonance and Pulse Radiolysis Studies of Some Reactions of $SO_4$, Radiation Research Laboratories and Department of Chemistry, Mellon Institute of Science, Carnegie-Mellon University, Pittsburgh, Pennsylvania 15213, The Journal of Physical Chemistry, vol. 79, No. 24, 1975.

Y. Tang, R.P. Thorn, R.L. Mauldin III, P.H. Wine, Kinetics and Spectroscopy of the $SO_4$-Radical in Aqueous Solution, Journal of Photochemistry and Photobiology, A: Chemistry, 44(1988), pp. 243-258, Elsevier Sequoia/Printed in The Netherlands.

Om P. Chawla and Richard W. Fessenden, Electron Spin Resonance and Pulse Radiolysis Studies of Some Reactions of $SO_4$, Radiation Research Laboratories and Department of Chemistry, Mellon Institute of Science, Carnegie-Mellon University, Pittsburgh, Pennsylvania 15213, The Journal of Physical Chemistry, vol. 79, No. 24, 1975.

"IUPAC Compendium of Chemical Terminology, $2^{ND}$ Edition" 1997, HTTP://GOLDBOOK.IUPAC.ORG/B00744.

* cited by examiner

SUPERABSORBENT POLYMERS COMPRISING DIRECT COVALENT BONDS BETWEEN POLYMER CHAIN SEGMENTS AND METHOD OF MAKING THEM

FIELD OF THE INVENTION

The present invention relates to superabsorbent polymers comprising polymer chain segments, which are directly bound to each other through covalent bonds.

Moreover, the invention relates to a process for making these superabsorbent polymer particles and to absorbent articles comprising these superabsorbent polymers.

BACKGROUND OF THE INVENTION

Superabsorbent polymers (SAPs) are well known in the art. They are commonly applied in absorbent articles, such as diapers, training pants, adult incontinence products and feminine care products to increase the absorbent capacity of such products while reducing their overall bulk. The SAPs generally are capable of absorbing and retaining amounts of aqueous fluids equivalent to many times their own weight.

Commercial production of SAPs began in Japan in 1978. The early superabsorbent was a cross-linked starch-polyacrylate. Partially neutralized polyacrylic acid eventually replaced earlier superabsorbents in the commercial production of SAPs, and is the primary polymer employed for SAPs today. They generally consist of a partially neutralized lightly cross-linked polymer network, which is hydrophilic and permits swelling of the network once submerged in water or an aqueous solution such as physiological saline. The cross-links between the polymer chains assure that the SAP does not dissolve in water. SAPs are often applied in form of small particles, such as fibers or granules.

After absorption of an aqueous solution, swollen SAP particles become very soft and deform easily. Upon deformation the void spaces between the SAP particles may be blocked, which drastically increases the flow resistance for liquids. This is generally referred to as "gel-blocking". In gel blocking situations liquid can move through the swollen SAP particles only by diffusion, which is much slower than flow in the interstices between the SAP particles.

One commonly applied way to reduce gel-blocking is to make the particles stiffer, which enables the SAP particles to retain their original shape thus creating or maintaining void spaces between the particles. A well-known method to increase stiffness is to cross-link the carboxyl groups exposed on the surface of the SAP particles. This method is commonly referred to as surface cross-linking.

The art refers e.g. to surface cross-linked and surfactant coated absorbent resin particles and a method of their preparation. The surface cross-linking agent can be a polyhydroxyl compound comprising at least two hydroxyl groups, which react with the carboxyl groups on the surface of the SAP particles. In some art, surface cross-linking is carried out at temperatures of 150° C. or above. The particles are preferably exposed to the elevated temperatures for at least 5 minutes but less than 60 minutes.

A water-soluble peroxide radical initiator as surface cross-linking agent is also known. An aqueous solution containing the surface cross-linking agent is applied on the surface of the polymer. The surface cross-linking reaction is achieved by heating to a temperature such that the peroxide radical initiator is decomposed while the polymer is not decomposed.

More recently the use of an oxetane compound and/or an imidazolidinone compound for use as surface cross-linking agent has been disclosed. The surface cross-linking reaction can be carried out under heat, wherein the temperature is preferably in the range of 60° C. to 250° C. Alternatively, the surface cross-linking reaction can also be achieved by a photo-irradiation treatment, preferably using ultraviolet rays.

In general, the surface cross-linking agent is applied on the surface of the SAP particles. Therefore, the reaction preferably takes place on the surface of the SAP particles, which results in improved cross-linking on the surface of the particles while not substantially affecting the core of the particles. Hence, the SAP particles become stiffer and gel-blocking is reduced.

A drawback of the commercial surface cross-linking process described above is that it takes a relatively long time, commonly at least about 30 min. However, the more time is required for the surface cross-linking process, the more surface cross-linking agent will penetrate into the SAP particles, resulting in increased cross-linking inside the particles, which has a negative impact on the capacity of the SAP particles. Therefore, it is desirable to have short process times for surface cross-linking. Furthermore, short process times are also desirable with respect to an overall economic SAP particle manufacturing process.

Another drawback of common surface cross-linking processes is that they take place only under relatively high temperatures, often around 150° C. or above. At these temperatures, not only the surface cross-linker reacts with the carboxyl groups of the polymer, but also other reactions are activated, e.g. anhydride-formation of neighboured carboxyl groups within or between the polymer chains, and dimer cleavage of acrylic acid dimers incorporated in the SAP particles. Those side reactions also affect the core, decreasing the capacity of the SAP particles. In addition, exposure to elevated temperatures can lead to colour degradation of the SAP particles. Therefore, these side reactions are generally undesirable.

SAPs known in the art are typically partially neutralized, e.g. with sodium hydroxide. However, in the processes known in the art, neutralization has to be carefully balanced with the need for surface cross-linking: The surface cross-linking agents known in the art only react with free carboxyl groups comprised by the polymer chains but they are not able to react with a neutralized carboxyl groups. Thus, the carboxyl groups can either be applied for surface cross-linking or for neutralization, but the same carboxyl group cannot be applied to fulfil both tasks. Surface cross-linking agents known in the art generally do not react with chemical groups other than carboxyl groups, e.g. they do not react with aliphatic groups.

In the process of making SAP particles, neutralization of free carboxyl groups typically comes first, before surface cross-linking takes place. Indeed, the neutralization step is often carried out in the very beginning of the process, before the monomers are polymerized and cross-linked to form the SAP. Such a process is named 'pre-neutralization process'. Alternatively, the SAP can be neutralized in the middle of polymerization or after polymerization ('post-neutralization'). Furthermore, a combination of these alternatives is also possible.

As the overall number of free carboxyl groups on the outer surface of the SAP particles is limited by the foregoing neutralization, it is very difficult to obtain particles with a high degree of surface cross-linking and hence, a high stiffness to reduce gel-blocking. Furthermore, it is very difficult to obtain SAP particles with evenly distributed surface cross-linking, as the remaining free carboxyl groups are not only few in number but generally also randomly distributed, which sometimes results in SAP particles with regions of rather dense surface cross-linking and regions of sparsely surface cross-linking.

It is therefore an objective of the present invention to provide SAP particles, which have a high degree of surface cross-linking and at the same time allow for a high degree of neutralization.

It is a further objective of the present invention to provide SAP particles with evenly distributed, homogenous surface cross-linking. Moreover, the surface comprising the surface cross-linking should be as thin as possible.

In addition, it is an even further objective of the present invention to provide SAPs and SAP particles, wherein the polymer chain segments comprised by the SAPs or SAP particles are cross-linked to each other without the need for a cross-linking molecule being built into the SAPs. This objective is especially desirable with respect to surface cross-linking, i.e. it is desirable to provide surface cross-linked SAP particles, which do not comprise the reaction product of the cross-linking molecules.

Furthermore, it is an objective of the present invention to provide a process to produce SAPs and SAP particles with the above-mentioned advantages.

It is a still further objective of the present invention to provide a process to produce SAP particles, wherein the process step of surface cross-linking can be carried out quickly to increase the efficiency of the process.

Moreover, a further objective of the present invention is to provide a process to produce SAP particles, which can be carried out at moderate temperatures in order to reduce undesired side reactions, initiated by elevated temperatures, such as anhydride-formation and dimer cleavage.

SUMMARY OF THE INVENTION

The present invention refers to superabsorbent polymers comprising polymer chain segments. At least a part of the polymer chain segments are cross-linked to each other through covalent bonds, wherein the covalent bonds are formed directly between polymer chain segments by a radical reaction with a radical former molecules, the radical former molecules being able to form bi-radicals.

The present invention refers further to a method of cross-linking superabsorbent polymers which comprises the steps of:
a) providing a superabsorbent polymer comprising polymer chain segments, and
b) providing radical former molecules, the radical former molecules being able to form bi-radicals upon electromagnetic irradiation, and
c) exposing the superabsorbent polymer and the radical former molecules to electromagnetic irradiation, thereby forming direct covalent bonds between the polymer chain segments.

DETAILED DESCRIPTION OF THE INVENTION

SAPs are available in a variety of chemical forms, including substituted and unsubstituted natural and synthetic polymers, such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof.

The SAPs useful for the present invention preferably comprise a homopolymer of partially neutralized $\alpha,\beta$-unsaturated carboxylic acid or a copolymer of partially neutralized $\alpha,\beta$-unsaturated carboxylic acid copolymerized with a monomer copolymerizable therewith.

A suitable method for polymerizing monomers is aqueous solution polymerization, which is well known in the art. An aqueous solution comprising monomers and polymerization initiator is subjected to a polymerization reaction. The aqueous solution may comprise e.g. $\alpha,\beta$-unsaturated carboxylic acid monomers, or may, alternatively, comprise $\alpha,\beta$-unsaturated carboxylic acid monomers and additional monomers, which are co-polymerizable with the $\alpha,\beta$-unsaturated carboxylic acid monomers. At least the $\alpha,\beta$-unsaturated carboxylic acid should be partially neutralized, either prior to polymerization of the monomers, during polymerization or after polymerization. In case the $\alpha,\beta$-unsaturated carboxylic acid is partially neutralized prior to polymerization, the monomers (including $\alpha,\beta$-unsaturated carboxylic acid monomers and possible comonomers) are at least 50%, more preferably at least 70%, even more preferably at least 75% and even more preferably from 75% to 95% neutralized.

The monomers in aqueous solution are polymerized by standard free radical techniques, commonly by using a photoinitiator for activation, such as ultraviolet (UV) light. Alternately, a redox initiator may be used. In this case, however, increased temperatures are necessary.

The polymer chains will preferably be lightly cross-linked to render them water-insoluble. The desired cross-linked structure may be obtained by the co-polymerization of the selected water-soluble monomer and a cross-linking agent possessing at least two polymerizable double bonds in the molecular unit. The cross-linking agent is present in an amount effective to cross-link the water-soluble polymer. The preferred amount of cross-linking agent is determined by the desired degree of absorption capacity and the desired strength to retain the absorbed fluid, that is, the desired absorption under load. Typically, the cross-linking agent is used in amounts ranging from 0.0005 to 5 parts by weight per 100 parts by weight of monomers (including $\alpha,\beta$-unsaturated carboxylic acid monomers and possible co-monomers) used. If an amount over 5 parts by weight of cross-linking agent per 100 parts is used, the resulting polymer has a too high cross-linking density and exhibits reduced absorption capacity and increased strength to retain the absorbed fluid. If the cross-linking agent is used in an amount less than 0.0005 parts by weight per 100 parts, the polymer has a too low cross-linking density and when contacted with the fluid to be absorbed becomes rather sticky, water-soluble and exhibits a low absorption performance, particularly under load. The cross-linking agent will typically be soluble in the aqueous solution.

Alternatively to co-polymerizing the cross-linking agent with the monomers, it is also possible to cross-link the polymer chains in a separate process step after polymerization.

After polymerization, cross-linking and partial neutralization, the viscous SAPs are dehydrated (i.e. dried) to obtain dry SAPs. The dehydration step can be performed by heating the viscous SAPs to a temperature of about 120° C. for about 1 or 2 hours in a forced-air oven or by heating the viscous SAPs overnight at a temperature of about 60° C. The content of residual water in the dehydrated SAP after drying predominantly depends on drying time and temperature and can range from 0.5% by weight of dry SAP up to 50% by weight of dry SAP. Preferably, the content of residual water in the dehydrated SAP after drying is 0.5%-45% by weight of dry SAP, more preferably 0.5%-30%, even more preferred 0.5%-15% and most preferred 0.5%-5%.

The SAPs can be transferred into particles of numerous shapes. The term "particles" refers to granules, fibers, flakes, spheres, powders, platelets and other shapes and forms known to persons skilled in the art of SAPs. E.g. the particles can be in the form of granules or beads, having a particle size of about 10 to 1000 μm, preferably about 100 to 1000 μm. In another embodiment, the SAPs can be in the shape of fibers, i.e. elongated, acicular SAP particles. In those embodiments, the SAP fibers have a minor dimension (i.e. diameter of the fiber) of less than about 1 mm, usually less than about 500 μm, and preferably less than 250 μm down to 50 μm. The length of the fibers is preferably about 3 mm to about 100 mm. The fibers can also be in the form of a long filament that can be woven.

The present invention relates to SAPs comprising polymer chain segments, wherein at least a part of said polymer chain segments are cross-linked to each other through covalent bonds formed directly between the polymer chain segments.

A "direct covalent bond" according to the present invention is a covalent bond wherein polymer chains are bound to each other only via a covalent bond with no intermediate atoms, such as atoms comprised by a cross-linking molecule. On the contrary, known cross-linking reactions between polymer chains always result in covalent bonds between these polymer chains, wherein the reaction product of the cross-linking molecule is built in between the polymer chains. Thus, known cross-linking reactions do not result in a direct covalent bond but in an indirect covalent bond comprising the reaction product of the cross-linking molecule. The direct covalent bond is formed between a carbon atom in the backbone of a first polymer chain and a carbon atom in the backbone of a second polymer chain. The bonds are formed intra-particulate within the SAP polymer, more specifically, they are formed on the surface of the SAP particles, while the core of the SAP particles is substantially free of such direct covalent bonds.

The method of making such SAPs can be applied on polymer chains, which have not been cross-linked to each other yet. Hence, the polymer chains are provided as a plurality of polymer chains, wherein the polymer chains may at least partially be branched.

Alternatively, the method can be applied for polymer chains, which have already been cross-linked by a cross-linker known in the art, comprising at least two polymerizable double bonds in the molecule unit. E.g. the method can be applied polymer chains comprised by SAP particles, e.g. for surface cross-linking. However, the direct covalent bonds between polymer chain segments according to the present invention are not intended to bond different SAP particles to each other. Thus, the method of the present invention, when applied on SAP particles, does not lead to any appreciable inter-particulate direct covalent bonds between different SAP particles but only results in intra-particulate direct covalent bonds within an SAP particle. If present, such interparticulate direct covalent bonds would hence require additional inter-particulate cross-linking materials, such as cross-linking molecules.

For applications, wherein the polymer chains have already been cross-linked and are thus provided in form of a network, the term "polymer chain segment" refers to the part of the polymer chains between two neighbouring, existing cross-links or to the part of the polymer chains between sites, where the polymer chain is branched.

However, if the polymer chains have not been pre-cross-linked at all prior to subjecting them to the cross-linking process of the present invention, the term "polymer chain segments" refers to a complete individual polymer chain.

In a preferred embodiment of the present invention, the polymer chain segment comprises polycarboxylic acid units. According to the present invention, the term "polycarboxylic acid unit" refers to a unit consisting of at least two carboxylic acid monomer units, which have been polymerized to each other and which are part of a larger polymer. The term "carboxylic acid monomer units" refers to the reaction product of the carboxylic acid monomer after the polymerization reaction and thus refers to the carboxylic acid monomer built into the polymer. In a preferred embodiment of the present invention, the polycarboxylic acid units consist of polyacrylic acid units or of polymethacylic acid units. A polyacrylic acid unit consists of at least two acrylic acid monomer units, which have been polymerized to each other. A polymethacrylic acid unit consists of at least two methacrylic acid monomer units, which have been polymerized to each other. Alternatively, the carboxylic acid unit may also consist of acrylic acid monomers units and methacylic acid monomers units, which have been copolymerized.

According to the present invention, the polycarboxylic acid units are at least partially neutralized, i.e. at least a part of the carboxylic acid units are neutralized.

Additional to the polycarboxylic acid units, the polymer chain segments may further comprise other units, such as polystyrene units. According to the present invention, the term "polystyrene unit" refers to a unit consisting of at least two styrene monomer units, which have been polymerized to each other and which are part of a larger polymer. The term "styrene monomer units" refers to the reaction product of the styrene monomer after the polymerization reaction and thus refers to the styrene monomer built into the polymer.

The polymer chain segment comprising e.g. polycarboxylic acid units in combination with other polymer units, such as polystyrene units is referred to as a "block polymer chain segment".

Most preferred polymers for use herein are slightly network crosslinked polymers of partially neutralized polyacrylic acids, slightly network crosslinked polymers of partially neutralized polymethacrylic acids, their copolymers and starch derivatives thereof. Most preferably, SAPs comprise partially neutralized, slightly network crosslinked, polyacrylic acid (i.e. poly (sodium acrylate/acrylic acid)). Preferably, the SAPs are at least 50%, more preferably at least 70%, even more preferably at least 75% and even more preferably from 75% to 95% neutralized. Network cross-linking renders the polymer substantially water-insoluble and, in part, determines the absorptive capacity of the hydrogel-forming absorbent polymers. Processes for network cross linking these polymers and typical network cross linking agents are described in greater detail in U.S. Pat. No. 4,076,663.

In the most preferred embodiment of the present invention, the method of directly bonding polymer chain segments to each other by a covalent bond is applied for surface cross-linking SAP particles instead of or additional to conventional surface cross-linking.

It has been found that radical former molecules, which are able to form bi-radicals upon electromagnetic irradiation by abstraction of hydrogen radicals. "Bi-radical" according to the present invention means that two radicals are induced within the same radical former molecule in close proximity to each other.

Such a bi-radical, in turn, is able to abstract two hydrogen radicals from nearby polymer chain segments and, therefore, can create two radicals in the polymer chain segments. As one bi-radical can induce two radicals in the polymer chain segments comprised by the SAP, these two radicals will be formed in close proximity to each other, e.g. in two different polymer chain segments, which are in close proximity to each other. Two of those radicals induced in the polymer chain segments can combine to form a direct covalent bond between polymer chain segments.

As the two radicals induced in the polymer chain segments are formed "pair-wise" in close proximity to each other by the bi-radical, the likelihood that they will actually react with each other is increased. Contrary thereto, in radical reactions with mono-functional radical-former molecules, which are only able to form one radical within the radical former molecule, the single radicals induced in the polymer chain segments are more likely not to be in close proximity to another radical induced in the polymer chain segment. Hence, it is less likely that two such radicals induced in the polymer chain segments will actually react with each other to form a direct covalent bond, due to the very short lifetime of radicals.

Therefore, it is highly desirable, that the radicals induced in the polymer chain segments are induced in close proximity to each other, as this increases the likelihood that these radicals will actually result in a direct covalent bond between two polymer chain segments.

Mono-functional radical former molecules, wherein only one radical can be induced within each molecule, are not comprised by the radical formers of the present invention. However, mono-functional radical former molecules may be used in addition to the radical former molecules of the present invention. In radical former molecules according to the present invention two radicals can be induced within each radical former molecule, without the radical former molecule dissociating into two individual radicals. According to the present invention, both radicals induced in the radical former molecule are covalently bound to each other, hence, forming a bi-radical.

Preferred radical former molecules according to the present preferably have a molecular weight of up to 5000. More preferably, they also have at least one hetero atom.

Such preferred radical former molecules according to the present invention are cyclic peroxides of phthalic acid and their derivates (FIG. 1),

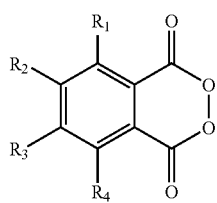

Figure 1

Other preferred radical former molecules of the present invention are cyclic peroxides of succinic acid and their derivatives (FIG. 2),

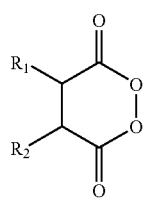

Figure 2

And still other preferred radical former molecules of the present invention are en-diynes according to FIG. 3, which are capable of forming a benzoic 1,4 diradical upon irradiation (Bergman Cyclization reaction):

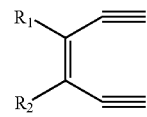

Figure 3

$R_1, R_2, R_3$ and $R_4$ can be hydrogen atoms or can be selected from the group comprising of substituted or un-substituted phenyls, $C_1$-$C_4$-alkyl groups, ethylenically un-saturated groups, such ethylenically un-saturated groups preferably comprising an acrylic or methacrylic group, an organic group having from 1 to 100 carbon atoms, which may be interrupted by up to 49 oxygen atoms. Any combination of such $R_1$, $R_2$, $R_3$ and $R_4$ substituents is possible. $R_1$, $R_2$, $R_3$ and $R_4$ can be identical or may be different from each other.

It should be noted, that while the radical former molecules according to Formula 1 and 2 have only one radiation activatable group (the O—O group), which is able to form radicals upon electromagnetic irradiation, these molecules are nevertheless able to form bi-radicals as depicted in FIGS. 4 and 5.

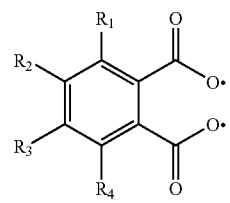

Figure 4

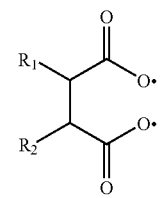

Figure 5

Hence, while almost all mono-functional radical formers comprising only one radiation activatable group are able to form only one radical within the radical former molecule, the radical former molecules according to Formula 1 and 2 have been consciously and specifically selected according to their ability to form a bi-radical.

The radical former molecules according to Formula 3 comprise two radiation acitvatable groups in close proximity to each other. Upon electromagnetic irradiation, one hydrogen radical is abstracted from each of the radication activatable groups, thus forming a bi-radical.

In a preferred embodiment of the present invention derivatization is done to either enable or further enhance water-solubility.

Cross-linkers known in the art, such as di- or polyhydric alcohols, or derivatives thereof, have to be thermally activated and are built into the SAPs.

Contrary thereto, the radical former molecule molecules of the present invention create direct covalent bonds between polymer chain segments and do not need to be incorporated into the SAP in order to provide surface cross-linking.

In the following, the reactions taking place to form a direct covalent bond when applying radical former molecules of the present invention to polymer chain segments, is set out schematically for polymer chain segments comprising polyacrylic acid units (PAA):

1) Upon UV initiation, two hydrogen atoms are abstracted from the radical former molecule, thereby the radical former molecule forms a bi-radical. The bi-radical can react with the PAA, whereby the bi-radical abstracts two hydrogen radicals from the PAA, to form two PAA-radicals. Thereby, the hydrogen radicals abstracted from the PAA chains covalently bond to the bi-radical, for example leaving the radical former in its reduced state.

2) Two PAA-radicals can combine to form a direct covalent bond between the polymer chain segments.

To determine, which of the above reactions have actually taken place, the reaction samples may be extracted with ether after UV initiation, and the extracts can be analysed via $^1$H-NMR and/or $^{13}$C-NMR. With NMR spectroscopy, the radical former molecules can be detected in their initial stage before having undergone a radical reaction. Moreover, the reaction products of the radical former molecules can be detected resulting from the radical reaction leading to direct covalent bonds between polymer chain segments within the SAP particles. Furthermore, it is also possible to detect the direct covalent bonds between the polymer chain segments with conventional methods of 2-dimensional NMR spectroscopy well known in the art.

However, to detect these direct covalent bonds, it is necessary, that enough direct covalent bonds have been formed in order to exceed the detection limit of the spectroscopy methods.

However, as a side-reaction of the present invention, a part of the radical former molecules may also be incorporated into the SAP particles vial covalent bonds between the radical former molecules and the polymer chain segments. In these side reactions, the surface cross-linking may take place upon electromagnetic irradiation by reaction of the activated photo-reactive group of the radical former molecule with an adjacent aliphatic C—H bond comprised by a polymer chain segment of the SAP. Instead of with an aliphatic C—H bond, the radical former molecule may also react with a functional group (e.g. carboxyl group) comprised by the polymer chain segment. As a result of this reaction a part of the radical former molecules may be covalently bound to the aliphatic groups and/or carboxyl groups comprised by the polymer chain segments of the SAP particles.

As the radical former molecules are able to form bi-radicals, the second photo-reactive group of the radical-former molecule may be activated upon electromagnetic irradiation, thus forming a radical. This reaction may take place after the radical former molecule has already been attached to a polymer chain segment via a covalent bond. If such a radical now reacts with a radical induced in another polymer chain segment, an indirect covalent bond between the polymer chain segments is formed, which comprises the reaction product of the radical former molecule. According to the present invention, the reaction product of the radical former molecule refers to the form of the radical former molecule after it has undergone a radical reaction.

However, the present invention refers to direct covalent bonds to cross-link different polymer chain segments to each other. Reactions, which result in the incorporation of the radical former molecules into the cross-link are only side reaction.

The radical former molecules are capable of forming radicals upon exposure to electromagnetic irradiation. Electron beams as well as UV-light can produce suitable electromagnetic irradiation. Preferably, according to the present invention UV-light is used with a wavelength of 220-380 nm, depending on the selected radical former molecule(s). The UV-light may be used in combination with an electron-beam, and also in combination with an IR-light. In case of combination of UV-irradiation with other electromagnetic irradiation is used, it is not critical if the application of the UV-light takes place simultaneously with the other electromagnetic irradiation (i.e. electron-beam or IR-light), or if irradiation is done in a series of different irradiation steps. For radical former molecule molecules, which require a relative high amount of activation energy, activation with electron beams may be necessary.

The UV irradiation can preferably be carried out in a conventional manner with UV lamps having a power between 50 W and 2 kW, more preferably between 200 W and 700 W, and even more preferred between 400 W and 600 W. Irradiation time is preferably between 0.1 sec. and 30 min., more preferably between 0.1 sec. and 15 min, even more preferably between 0.1 sec. and 5 min and most preferably between 0.1 sec. and 2 min. Commercially available mercury pressure UV-lamps can be used. The choice of the lamp depends on the absorption spectrum of the radical former molecules used. Lamps having a higher power generally permit more rapid cross-linking. The distance between the UV-lamp(s) and the SAP which is to be cross-linked preferably varies between 5 cm and 15 cm.

Upon electromagnetic irradiation, such as UV irradiation, the radical former molecule molecules form free radicals. The highly reactive free radicals formed thereby are able to react with polymer chain segments comprised by the superabsorbent polymer. When a free radical formed from the radical former molecule reacts with a polymer chain segment, the polymer chain segment forms a "polymer chain segment radical". It is believed that reaction within the polymer chain segment takes place on an aliphatic group (C—H group) comprised by the polymer chain segment. Alternatively, the reaction may also take place on those carboxylic groups comprised by the polymer chain segment, which have not been neutralized. A further alternative is that the reaction takes place on another functional group comprised by the polymer chain segment if the functional group comprises a hydrogen radical that can be abstracted. Examples of such functional groups are sulfonic acid, carboxylic acid or sulfonic acid esters, hydroxyl groups, amide-groups, amino groups, nitrile groups, quaternary ammonium salt groups, aryl groups (e.g., phenyl groups, such as those derived from styrene monomer). When two such polymer chain segment radicals react with each other, a direct covalent bond between the polymer chain segments is formed.

It is believed that the reaction which leads to direct covalent bonds between polymer chain segments preferably takes place on molecules comprised by the polymer backbone.

Preferred radical former molecule molecules according to the present invention have a molecular weight of at least Mw=50 g/mol, more preferred at least Mw=100 g/mol, still more preferred at least Mw=120 g/mol, even more preferred at least Mw=180 g/mol and most preferred at least Mw=240 g/mol. Radical former molecules having a relatively high molecular weight often tend to form more stable radicals, as the charge of the radical can be distributed better within the radical. Hence, the radical is more likely to reach a polymer chain segment within the reaction solution and are able to react with the polymer chain segment to form a "polymer chain segment radical".

Furthermore, preferred radical former molecules according to the present invention will comprise aromatic groups, such as arenes. This also leads to more stable radicals as the charge can be distributed throughout the aromatic group.

According to the present invention the dehydrated SAP particles may undergo a surface cross-linking process step. The term "surface" describes the outer-facing boundaries of the particle. For porous SAP particles, exposed internal surfaces may also belong to the surface. The term "surface cross-linked SAP particle" refers to an SAP particle having its polymer chain segments present in the vicinity of the particle surface cross-linked to each other. It is known in the art to surface cross-link the polymer chain segments present in the vicinity of the particle surface by a compound referred to as surface cross-linker. The surface cross-linker is applied to the surface of the particle. In a surface cross-linked SAP particle the level of cross-links in the vicinity of the surface of the SAP particle is generally higher than the level of cross-links in the interior of the SAP particle.

Commonly applied surface cross-linkers are thermally activatable surface cross-linkers. The term "thermally activatable surface cross-linkers" refers to surface cross-linkers, which only react upon exposure to increased temperatures, typically around 150° C. Thermally activatable surface cross-linkers known in the prior art are e.g. di- or polyfunctional agents that are capable of building additional cross-links between the polymer chains of the SAPs. Other thermally activatable surface cross-linkers include, e.g., di- or polyhydric alcohols, or derivatives thereof, capable of forming di- or polyhydric alcohols. Representatives of such agents are alkylene carbonates, ketales, and di- or polyglycidylethers. Moreover, (poly)glycidyl ethers, haloepoxy compounds, polyaldehydes, polyoles and polyamines are also well known thermally activatable surface cross-linkers. The cross-linking is based on a reaction between the functional groups comprised by the polymer, for example, an esterification reaction between a carboxyl group (comprised by the polymer) and a hydroxyl group (comprised by the surface cross-linker). As typically a relatively big part of the carboxyl groups of the polymer chain segments is neutralized prior to the polymerization step, commonly only few carboxyl groups are available for this surface cross-linking process known in the art. E.g. in a 70% percent neutralized polymer only 3 out of 10 carboxylic groups are available for covalent surface cross-linking.

According to the present invention, surface cross-linking does not have to comprise a surface cross-linker, the reaction product of which will be built into the SAP particle after surface cross-linking. On the contrary, according to the present invention, it is possible to surface cross-link the polymer chain segments by directly bonding the polymer chain segments to each other through a covalent bond. The radical former molecule, which initiates the reaction, does not get built in the SAP particle. Optionally, the final reaction product of the radical former molecule can be regenerated after surface cross-linking and hence, after regeneration, can be used again for surface cross-linking. No additional monomers, such as carboxylic acids or styrenes, are required if the radical former molecule is used for surface cross-linking of SAP particles.

If the radical former molecules are used for surface cross-linking of SAP particles, the direct covalent bonds between polymer chain segments on the surface of the SAP particles are formed intra-particulate. They are not intended to form inter-particle bonds.

Further, if the radical former molecules are used for surface cross-linking of SAP particles, the radical former molecules may be sprayed onto the SAP particles by means of a fluidized-bed spraying chamber. Simultaneously IR-irradiation may be applied to accomplish drying and simultaneously UV-light may be applied to accomplish cross-linking in the fluidized-bed.

However, in certain cases drying and cross-linking may take place in two steps in series, which could be carried out in any order. Instead or in combination with IR-light, any conventional drying equipment can be used in the drying step. However, in certain embodiments of the present invention little or no drying is required, e.g. in cases, where only small amounts of surface cross-linkers are applied dissolved in small amounts of solution.

Prior art surface cross-linking has been restricted to carboxylic groups comprised by the polymer chain segments exposed on the surface of the SAP particle. Advantageously, the cross-linking process of the present invention is not restricted to the carboxyl groups but also comprises numerous other functional groups and aliphatic groups within the polymer chains of the SAP. Hence, according to the present invention the number of available reaction sites for the surface cross-linking process of the SAP particles is strongly increased. Therefore, it is possible to achieve a far more homogenous, uniform surface cross-linking compared to the surface cross-linking known from the art. Furthermore, it is possible to surface cross-link the SAP to a higher degree than the SAP known from the prior art. This enables to make the SAP particles much stiffer, thus, to more effectively inhibit the gel-blocking effect at any given degree of neutralization.

Surface cross-linking of SAP particles mainly takes place on the surface of the SAP particles. That means that mainly polymer chain segments, which are exposed in the vicinity of the surface of the SAP particles, undergo a cross-linking process, leading to SAP particles with a high degree of cross-linking on their surface while not substantially affecting the inner core of the SAP particles. Hence, the covalent bonds formed directly between said polymer chain segments are formed mainly on the surface of said superabsorbent particles whereas said core is substantially free of said covalent bonds.

The UV irradiation for the surface cross-linking can preferably be carried out in a conventional manner with UV lamps having a power between 50 W and 2 kW, more preferably between 200 W and 700 W, and even more preferred between 400 W and 600 W. Irradiation time is preferably between 0.1 sec. and 30 min., more preferably between 0.1 sec. and 15 min, even more preferably between 0.1 sec. and 5 min and most preferably between 0.1 sec. and 2 min. Commercially available mercury pressure UV-lamps can be used. The choice of the lamp depends on the absorption spectrum of the radical former molecules used. Lamps having a higher power generally permit more rapid cross-linking. The distance between the UV-lamp(s) and the SAP which is to be cross-linked preferably varies between 5 cm and 15 cm.

Compared to the surface cross-linking known from the prior art, the surface cross-linking according to the present invention is much quicker. Prior art surface cross-linking reactions carried out under increased temperatures commonly take up to 45 minutes. This time consuming process step renders the manufacturing process of SAP particles less economic than desirable. On the contrary, the cross-linking process according to the present invention can be carried out very quickly and hence, strongly adds to a much more efficient and economic overall manufacturing process.

Furthermore, as the surface cross-linking reaction proceeds quickly, the surface cross-linking molecules applied on the surface of the SAP particles have less time to penetrate inside the SAP particles. As a result, the surface cross-linking process is mainly restricted to the surface of the SAP particles and avoids undesired further cross-linking reactions inside the SAP particles.

Another advantage of the present invention refers to the neutralization step. α,β-unsaturated carboxylic acid monomers are often neutralized prior to the polymerization step (pre-neutralization). Compounds, which are useful to neutralize the acid groups of the monomers, are typically those, which will sufficiently neutralize the acid groups without having a detrimental effect on the polymerization process. Such compounds include alkali metal hydroxides, alkali metal carbonates and bicarbonates. Preferably, the material used for neutralization of the monomers is sodium or potassium hydroxide or carbonate. The neutralizing compound is preferably added to an aqueous solution comprising the α,β-unsaturated carboxylic acid monomers (pre-neutralization). As a result, the carboxyl groups comprised by the α,β-unsaturated carboxylic acid monomers are at least partially neutralized. Consequently, —after the polymerization step— also the carboxyl groups comprised by the α,β-unsaturated carboxylic acid of the polymer are at least partially neutralized. In case sodium hydroxide is used, neutralization results in sodium acrylate, which dissociates in water into negatively charged acrylate monomers and positively charged sodium ions.

If the final SAP particles are in the swollen state, after they absorb aqueous solution, the sodium ions are freely movable within the SAP particles. In absorbent articles, such as diapers or training pants, the SAP particles typically absorb urine. Compared to distilled water, urine comprises a relatively high amount of salt, which at least partly is present in dissociated form. The dissociated salts comprised by the urine make absorption of liquid into the SAP particles more difficult, as the liquid has to be absorbed against an osmotic pressure caused by the ions of the dissociated salts. The freely movable sodium ions within the SAP particles strongly facilitate the absorption of liquid into the particles, because they reduce the osmotic pressure. Therefore, a high degree of neutralization can largely increase the capacity of the SAP particles and the speed of liquid absorption.

The surface cross-linkers known in the art react with the carboxyl groups of the polymer. Hence, the degree of neutralization has to be balanced with the need to surface cross-link, because both process steps make use of the carboxyl groups.

According to the present invention, the surface cross-linking reaction using radical former molecules and forming direct covalent bonds between polymer chain segments is not restricted to carboxyl groups but further comprises other groups within the polymer chain segment such as aliphatic groups. Therefore, it is possible to neutralize the monomers to a larger degree without significantly diminishing the possibility of later surface cross-linking.

According to the present invention, the carboxyl groups comprised by the α,β-unsaturated carboxylic acid monomers are preferably at least 50%, more preferably at least 70%, even more preferably at least 75% and even more preferably between 75% and 95% neutralized. Hence, also the carboxyl groups comprised by the α,β-unsaturated carboxylic acid of the polymer are at least 50%, more preferably at least 70%, even more preferably at least 75% and even more preferably between 75% and 95% neutralized.

A still further advantage of the present invention is the reduction of undesired side-reactions during the surface cross-linking process. Surface cross-linking known from the prior art requires increased temperatures, commonly around or above 150° C. At these temperatures, not only the surface cross-linking reaction is achieved, but also a number of other reactions take place, e.g. anhydrate-formation within the polymer or dimer cleavage of dimers previously formed by the acrylic acid monomers. These side-reactions are highly undesired, because they result in SAP particles with decreases capacity.

As the surface cross-linking process according to the present invention does not necessarily need increased temperatures but can also be carried out at moderate temperatures using electromagnetic irradiation, such as UV irradiation, those side-reactions are substantially eliminated. According to the present invention, the surface cross-linking reaction using radical former molecules and electromagnetic irradiation can preferably be accomplished at temperatures of less than 100° C., preferably at temperatures less than 80° C., more preferably at temperatures less than 50° C., even more preferably at temperatures less than 40° C., most preferably at temperatures between 20° C. and 40° C.

At elevated temperatures around or above 150° C. commonly applied in the surface cross-linking process known from the prior art, the SAP particles sometimes change their colour from white to yellowish. As according to the surface cross-linking process of the present invention, it is possible to carry out the surface cross-linking process under moderate temperatures, the problem of colour degradation of the SAP particles is strongly reduced.

According to the present invention, one type of radical former molecules can be selected or, alternatively, two or more different types of radical former molecules able to from bi-radicals can be applied.

As a further alternative, one or more types of radical former molecules can be applied together thermally activatable surface cross-linkers, e.g. 1,4-butandiol. In this embodiment, the SAP particles have to comprise carboxyl groups wherein at least some of the carboxyl groups are at least partially exposed on the outer surface of the SAP particles and wherein the thermally activated surface cross-linker is covalently bound to at least a part of the carboxyl groups at least partially exposed on the surface of said superabsorbent polymer particles.

In case radical former molecules are used together with thermally activatable surface cross-linkers, both UV irradiation and increased temperatures (above 140° C.) are necessary for the surface cross-linking process.

The radical former molecules are preferably used in a liquid solution, more preferably in an aqueous solution.

To obtain SAP particles with evenly distributed surface cross-linking, the radical former molecules have to be distributed evenly on the SAP particle prior to or during UV irradiation. Therefore, the radical former molecules are preferably applied by spraying onto the SAP particles.

However, though preferred, the present invention is not restricted to surface cross-linking of SAP particles. It is also possible to directly covalently cross-link polymer chain segments well before the SAP particles have been formed. For example, the radical former molecules can be applied to polymer chains formed from polymerization reaction of the respective monomers before the polymer chains have been cross-linked to each other to form a network. In this embodiment, the cross-linking with the radical former molecules may replace the cross-linking processes known in the art.

Alternatively, the cross-linking according to the present invention can be carried out in addition to known cross-linking process, either prior to the known processes, simultaneously or afterwards.

In these embodiments the radical former molecules are not applied to SAPs, which have been formed into particles.

Consequently, if the polymer is transformed into SAP particles, the direct covalent cross-links between the polymer chain segments is not restricted mainly to the surface of the SAP particles, but the direct covalent bonds between polymer chain segments will be present throughout the SAP particles, possibly the direct covalent bonds will distributed homogeneously throughout the SAP particles.

Alternatively, the direct covalent bonds between polymer chain segments will be distributed in-homogeneously throughout the SAP particle: For example, it is possible to mix different polymers comprising different polymer chain segments. In this case, the different polymer chains may be cross-linked (directly or indirectly by a process known in the art) to a different degree or polymers chains in certain regions of the SAP particles may not be cross-linked at all.

It is also possible to mix different polymers for forming the SAP particles comprising different polymer chain segments. In this case, the different polymers may comprise mixtures of different homopolymers, copolymers and/or block polymers.

However, all such SAP particles comprising direct covalent bonds throughout the SAP particles may undergo surface cross-linking. In this instance, the surface cross-linking may be achieved by subjecting the SAP particles to the radical former molecule of the present invention, by subjecting them to a surface cross-linking process known in the art or by a combination of both.

Absorbent Articles

The SAP particles of the present invention are preferably applied in absorbent cores of absorbent articles. As used herein, absorbent article refers to devices that absorb and contain liquid, and more specifically, refers to devices that are placed against or in proximity to the body of the wearer to absorb and contain the various exudates discharged from the body. Absorbent articles include but are not limited to diapers, adult incontinent briefs, diaper holders and liners, sanitary napkins and the like.

Preferred absorbent articles of the present invention are diapers. As used herein, "diaper" refers to an absorbent article generally worn by infants and incontinent persons about the lower torso.

Absorbent articles especially suitable for the present invention typically comprise an outer covering including a liquid pervious topsheet, a liquid impervious backsheet and an absorbent core generally disposed between the topsheet and the backsheet. The absorbent core may comprise any absorbent material that is generally compressible, conformable, non-irritating to the wearer's skin, and capable of absorbing and retaining liquids such as urine and other certain body exudates. In addition to the SAP particles of the present invention, the absorbent core may comprise a wide variety of liquid-absorbent materials commonly used in disposable diapers and other absorbent articles such as comminuted wood pulp, which is generally referred to as air felt.

Exemplary absorbent structures for use as the absorbent assemblies are described in U.S. Pat. No. 5,137,537 entitled "Absorbent Structure Containing Individualized, Polycarboxylic Acid Crosslinked Wood Pulp Cellulose Fibers" which issued to Herron et al. on Aug. 11, 1992; U.S. Pat. No. 5,147,345 entitled "High Efficiency Absorbent Articles For Incontinence Management" issued to Young et al. on Sep. 15, 1992; U.S. Pat. No. 5,342,338 entitled "Disposable Absorbent Article For Low-Viscosity Fecal Material" issued to Roe on Aug. 30, 1994; U.S. Pat. No. 5,260,345 entitled "Absorbent Foam Materials For Aqueous Body Fluids and Absorbent Articles Containing Such Materials" issued to DesMarais et al. on Nov. 9, 1993; U.S. Pat. No. 5,387,207 entitled "Thin-Until-Wet Absorbent Foam Materials For Aqueous Body Fluids And Process For Making Same" issued to Dyer et al. on Feb. 7, 1995; U.S. Pat. No. 5,397,316 entitled "Slitted Absorbent Members For Aqueous Body Fluids Formed Of Expandable Absorbent Materials" issued to LaVon et al. on Mar. 14, 1995; and U.S. Pat. No. 5,625,222 entitled "Absorbent Foam Materials For Aqueous Fluids Made From high In al. on Jul. 22, 1997.

Methods

Photolysis:

200 mg of PAA is mixed with 5 mg of the respective radical former molecule either in the dry state or solved/suspended in 1.5 ml of water. Photolysis is carried out for either 10 or 60 minutes with a 450 W medium pressure Hg lamp as UV source. Such lamp mostly generates light at a wavelength of 365 nm. All samples are degassed prior to photolysis by either pumping to $10^{-5}$ torr or three freeze-pumping-thaw cycles.

All documents cited in the Detailed Description of the Invention, are, in relevant part, incorporated herein by reference; the citation of any document is not to be construed as an admission that it is prior art with respect to the present invention. To the extent that any definition or meaning of a term in this written document conflicts with any definition or meaning of the term in a document incorporated by reference, the definition or meaning assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A superabsorbent polymer particle comprising polymer chain segments, the superabsorbent polymer particle having a surface that includes a plurality of evenly distributed, homogeneous surface crosslinks and a core, that includes crosslinks, wherein said surface crosslinks are direct covalent bonds formed directly between aliphatic carbon atoms of said polymer chain segments on said surface;
   wherein said crosslinks in the core are substantially free of direct covalent bonds formed directly between aliphatic carbon atoms of said polymer chain segments in said core.

2. The superabsorbent polymer particle according to claim 1, wherein at least some of said direct covalent bonds are formed by using radical former molecules having a molecular weight of up to 5000.

3. The superabsorbent polymer particle according to claim 2, wherein said radical former molecules have at least one hetero atom per molecule.

4. The superabsorbent polymer particle according to claim 2, wherein said radical former molecules are selected from the group consisting of:
   a. cyclic peroxides of phthalic acid and their derivates;
   b. cyclic peroxides of succinic acid and their derivatives;
   c. en-diyne derivates of the formula

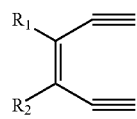

wherein $R_1$ and $R_2$, are hydrogen atoms or are selected from the group consisting of substituted or un-substituted phenyls, $C_1$-$C_4$-alkyl groups, ethylenically un-saturated groups, an organic group having from 1 to 100 carbon atoms; and
   d. any combination thereof.

5. The superabsorbent polymer particle according to claim 4, wherein said radical former molecules are derivatized to either enable or further enhance water-solubility.

6. The superabsorbent polymer particle according to claim 1, wherein the direct covalent bonds are solely formed intra-particulate.

7. An absorbent article comprising a substantially liquid pervious topsheet, a substantially liquid impervious backsheet and an absorbent core between said topsheet and said backsheet, wherein said absorbent article comprises the superabsorbent polymer particle according to claim 1.

* * * * *